United States Patent [19]

Jaggar

[11] Patent Number: 5,701,493
[45] Date of Patent: Dec. 23, 1997

[54] EXCEPTION HANDLING METHOD AND APPARATUS IN DATA PROCESSING SYSTEMS

[75] Inventor: David Vivian Jaggar, Cambridge, United Kingdom

[73] Assignee: Advanced Risc Machines Limited, Cambridge, United Kingdom

[21] Appl. No.: 510,705

[22] Filed: Aug. 3, 1995

[51] Int. Cl.⁶ .................................................. G06F 9/46
[52] U.S. Cl. ........................ 395/734; 395/570; 395/591
[58] Field of Search ............................. 395/734, 733, 395/740, 735, 570, 591

[56] References Cited

U.S. PATENT DOCUMENTS

| | | | |
|---|---|---|---|
| 5,036,458 | 7/1991 | Matsushima et al. | 395/775 |
| 5,155,853 | 10/1992 | Mitsuhira et al. | 395/734 |
| 5,386,563 | 1/1995 | Thomas | 395/650 |
| 5,530,873 | 6/1996 | Takano | 395/733 |
| 5,535,397 | 7/1996 | Durante et al. | 395/740 |

*Primary Examiner*—Glenn A. Auve
*Attorney, Agent, or Firm*—Albert C. Smith, of Fenwick & West LLP

[57] ABSTRACT

A CPU architecture is provided having a user mode (User32), a plurality of exception modes (IRQ32 etc) and a system mode (System) entered via one of the exception modes. The system mode re-uses the same set of registers (16) as the user mode and yet has access to a set of privileged resources compared to the standard resources of the user mode. Interrupt of the same type are disabled when the system is already in that exception mode, but are re-enabled when the system is moved into the system mode. Branch instructions may be used in the user and system modes, but not the exception modes.

16 Claims, 11 Drawing Sheets

| Priviledged | Undef32 | R0 | R1 | R2 | R3 | R4 | R5 | R6 | R7 | R8 | R9 | R10 | R11 | R12 | R13undef | R14undef | R15pc | CPSR | SPSRundef |
|---|---|---|---|---|---|---|---|---|---|---|---|---|---|---|---|---|---|---|---|
| | IRQ32 | R0 | R1 | R2 | R3 | R4 | R5 | R6 | R7 | R8 | R9 | R10 | R11 | R12 | R13irq | R14irq | R15pc | CPSR | SPSRirq |
| | Abt32 | R0 | R1 | R2 | R3 | R4 | R5 | R6 | R7 | R8 | R9 | R10 | R11 | R12 | R13abt | R14abt | R15pc | CPSR | SPSRabt |
| | SVC32 | R0 | R1 | R2 | R3 | R4 | R5 | R6 | R7 | R8 | R9 | R10 | R11 | R12 | R13svc | R14svc | R15pc | CPSR | SPSRsvc |
| | FIQ32 | R0 | R1 | R2 | R3 | R4 | R5 | R6 | R7 | R8fiq | R9fiq | R10fiq | R11fiq | R12fiq | R13fiq | R14fiq | R15pc | CPSR | SPSRfiq |
| | System | R0 | R1 | R2 | R3 | R4 | R5 | R6 | R7 | R8 | R9 | R10 | R11 | R12 | R13 | R14 | R15pc | CPSR | |
| Unpriviledged | User32 | R0 | R1 | R2 | R3 | R4 | R5 | R6 | R7 | R8 | R9 | R10 | R11 | R12 | R13 | R14 | R15pc | CPSR | |

EXCEPTION HANDLING METHOD AND APPARATUS IN DATA PROCESSING SYSTEMS

BACKGROUND OF THE INVENTION

1. Field of the Invention

This invention relates to the field of data processing. More particularly, this invention relates to the handling of exceptions, such as hardware interrupts, aborts and undefined instructions, within data processing systems.

2. Description of the Prior Art

It is known to provide central processing units (CPUs) that are operable in both a user mode and one or more exception modes. The user mode is used for execution of the application software performing the user's desired data processing. The exception modes are usually used for operations such as responding to externally applied interrupt signals. An example of such a system is described in U.S. Pat. No. 5,386,563.

A design goal when producing such data processing systems is to make the time taken to handle an exception as short as possible. The system described in U.S. Pat. No. 5,386,563 addresses this problem by providing additional registers to which read and write requests are re-directed and status information saved when an exception mode is entered. Providing these extra registers removes the need to write to memory all the current user mode register contents and status information prior to dealing with the interrupt. One piece of information that must be transferred through to the exception mode is the return address to be used to restart processor in the user mode from the point at which it was interrupted after the exception has been dealt with. The interrupt hardware provides for this by writing this return address into a fixed register location (R14xx) when the exception occurs.

Whilst such an approach provides high speed operation, it suffers from the disadvantage that further exceptions (of at least the same exception type) must be disabled or somehow otherwise avoided when the exception mode is entered to ensure that this return address is not overwritten by a later return address being forced into the same location before the original return address can be stored or preserved in some other way. The disabling of further exceptions is a disadvantage since the ability to handle such exceptions is an important factor in ensuring correct operation and data integrity through the proper and timely handling of unexpected and/or asynchronous events.

A further restriction with the above described approach is that branch instructions (sub-routine calls) within the CPU also write their return address to the same register (R14xx). Accordingly, if such a branch instruction is used within any exception handling code, then, if a further exception occurs, the return address for the branch instruction will be overwritten and lost if it has not yet been stored elsewhere, e.g. the branch had only just occurred. In view of this, exception handling code may not safely utilise branch instructions. This is a significant disadvantage when producing what may be sophisticated and lengthy exception handling routines.

In order to more fully understand these problems with the prior art, the system of U.S. Pat. No. 5,386,563 will be more fully described (the system of U.S. Pat. No. 5,386,563 is based on the ARM6 processor produced by Advanced RISC Machines Limited).

Figure 1:
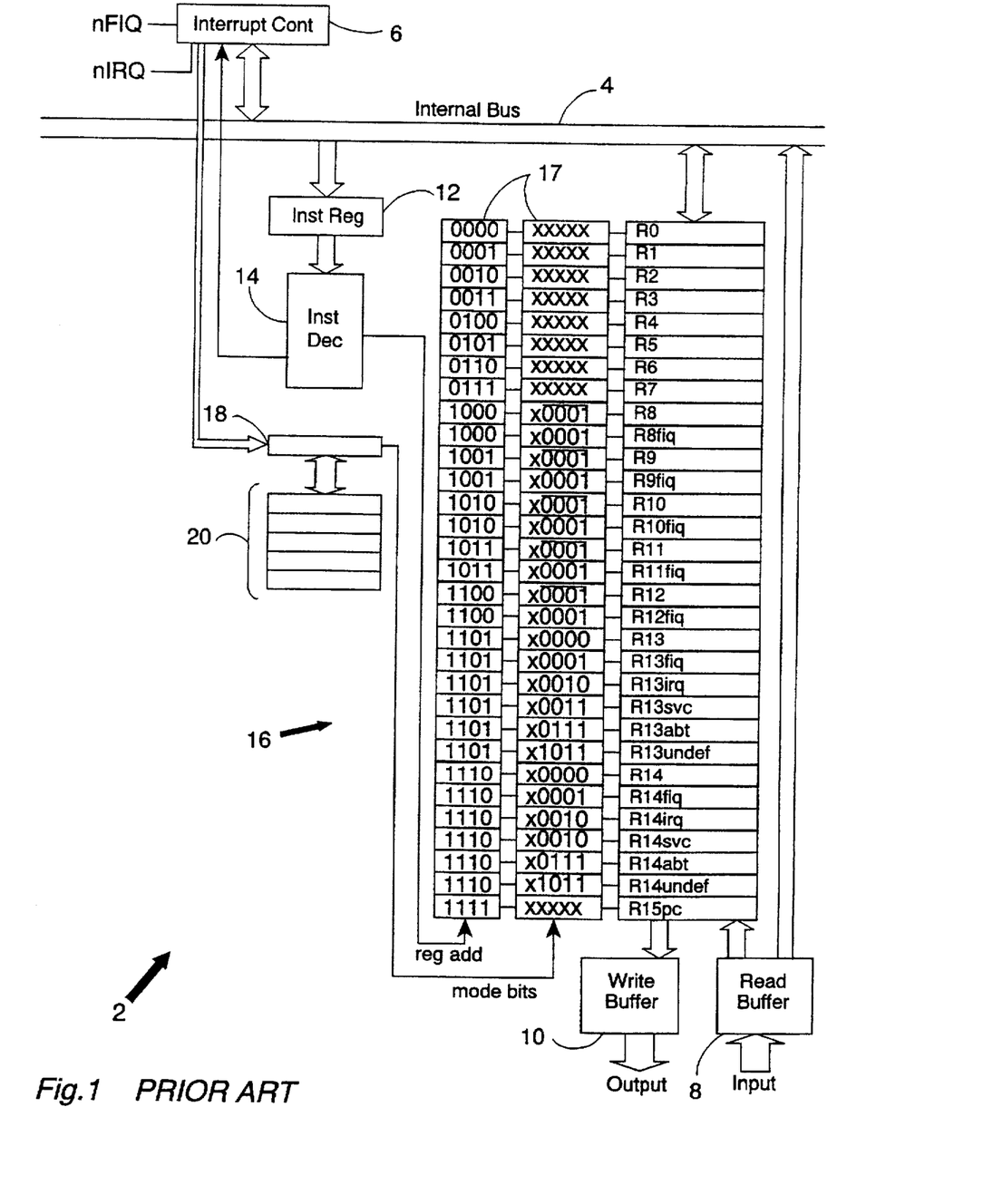
FIG. 1 schematically illustrates a known CPU architecture.

FIG. 1 of the accompanying drawings schematically illustrates a part of a CPU 2. The CPU 2 contains an internal bus 4 by which the various portions of the CPU 2 communicate. An interrupt controller 6 is attached to the internal bus 4. The interrupt controller 6 receives external inputs nFIQ and nIRQ that are signal indicating interrupt requests applied to external pins on the CPU package.

An external data bus communicates with a read buffer 8 and a write buffer 10 via which data (either data to be manipulated or instruction data) is respectively read into or written out from the CPU. Instruction data read into the read buffer 8 can be fed directly to the internal bus 4 and then to an instruction register 12 where they are stored and then decoded for action by an instruction decoder 14. Data to be manipulated may be input or output from a register bank 16 via the read buffer 8 and write buffer 10 respectively. The data within the registers of a register bank 16 is manipulated under control of decoded instructions using the instruction decoder 14.

A processing status register 18 stores processing status information (e.g. flags indicating whether fast or slow interrupts are allowed) and includes a section indicating the current processing mode of the CPU 2. A bank of saved processing status registers 20 are provided to store a previous set of active processing status data when a change is made between processing modes. Amongst other tasks, the contents of the processing status register 18 are used with an output from the instruction decoder 14 to produce a composite register address that uniquely identifies one register within the register bank 16 upon which a particular instruction is to be carried out. The composite register address is compared in parallel with all of the stored addresses with the register address decoder 17 (an x indicates either an 0 or a 1 matches).

Figure 2:
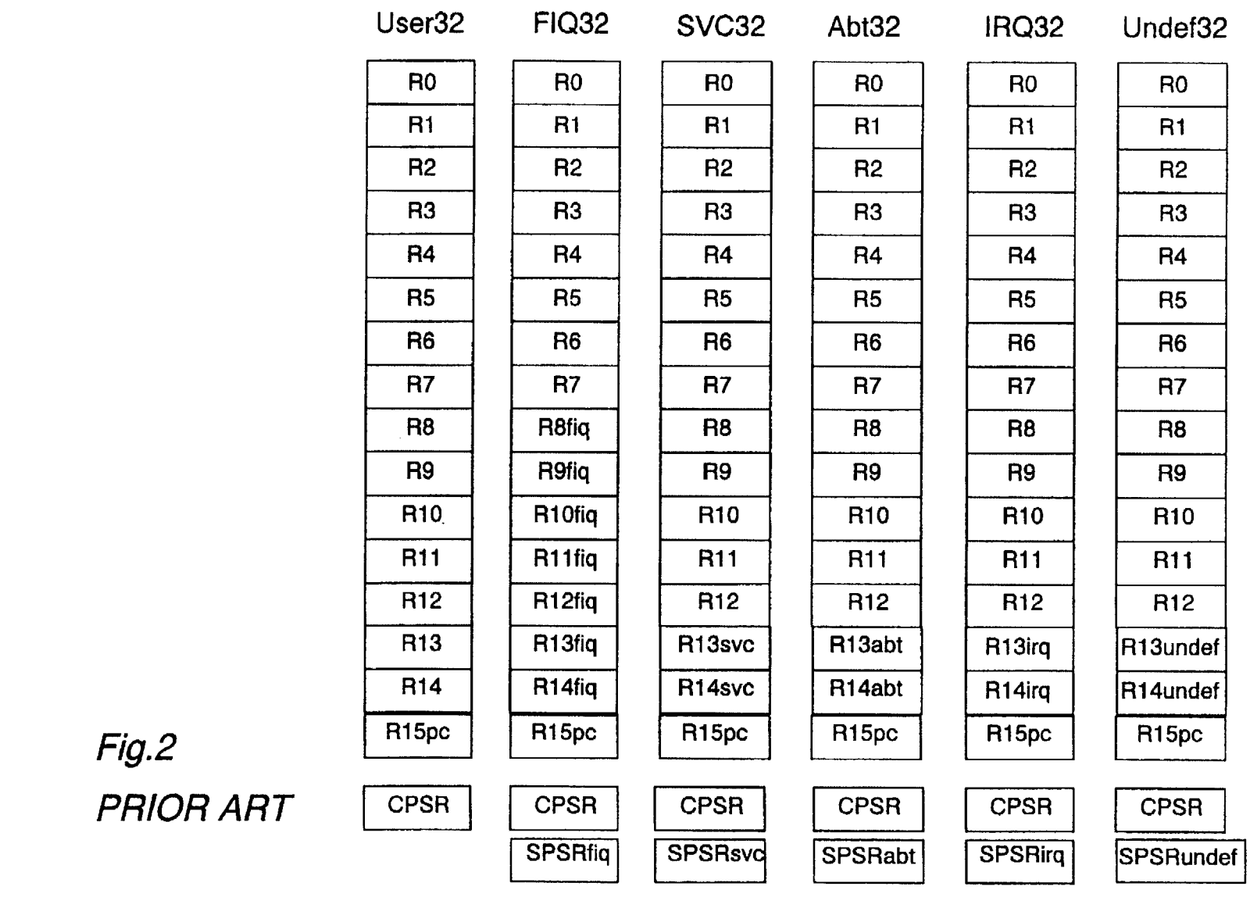
FIG. 2 illustrates the data registers available in a user mode a number of exception modes for the system of FIG. 1.

FIG. 2 of the accompanying drawings illustrates the different registers available during a user mode User32 and various exception modes. In the user mode fifteen general purpose registers R0 to R14 are provided for data manipulation operations. A program counter register R15pc is provided to serve as a program counter indicating the current position within a sequence of instructions to be executed. A current program status register CPSR stores various flags indicating control parameters of the CPU 2 and five bits indicating the current processing mode. The mode User32 is provided for the execution of user application software.

The remaining five processing modes illustrated are all differing types of exception processing mode. The exception processing modes are: supervisor (SVC32) which is entered when the processor is reset or a software interrupt instruction is executed; undefined (Undef32) which is entered when an undefined instruction enters the execution unit; abort (Abt32) which is entered when the memory system aborts a memory access (either a data access or an instruction prefetch); interrupt request (IRQ32) entered when the nIRQ pin is held low and the Ibit in the CPSR is clear indicating that such slow interrupt requests are allowed; and a fast interrupt request (FIQ32) entered when the nFIQ pin is held low and the Fbit in the CPSR is clear indicating that such fast interrupts are allowed.

Each of the exception modes SVC32, Abt32, IRQ32 and Undef32 have two exception mode registers associated with them that substitute for the user mode registers R13 and R14 respectively when one of these modes is entered. R13 is the usual register used to store a stack pointer in both the user mode User32 and the exception modes. When one of the exception modes is entered the system stores the contents of R15pc in the R14 register of the mode being enter to serve as the return address register. This provides ready access to the return address when the exception handling code for that mode is exited.

Each of the exception modes has an associated saved program status register SPSR. These SPSRs save the contents of the CPSR from the previous mode and allow this to be restored to the CPSR when the previous mode is returned to.

The fast interrupt mode FIQ32 has seven exception mode registers (R8fiq to R14fiq) as opposed to two exception mode registers for the other exception modes. The result of this is that exception mode registers R8fiq to R12fiq are available for immediate use upon entering the FIQ32 mode. It is also of note that the write buffer 10 of FIG. 1 is the equivalent of eight registers deep and so if the exception handling code of mode FIQ32 requires that the registers R0 to R7 be saved, then this can be achieved in a short time since they can be completely held within the write buffer 10. The CPU is provided with a load multiple instruction and store multiple instruction that allow any of the sixteen active registers to be loaded and stored (e.g. LDM R1,{R0,R3,R4, R6,R14,R15pc} loads the registers inside the { } from an area of memory starting at address R1). The instruction decoder 14 controls the operation of the CPU to perform this operation.

Consider the example of moving between the User32 mode and the SVC32 mode. In this case, exception mode registers R13svc and R14svc replace registers R13 and R14 respectively. The contents of R15pc from the User32 mode are saved in the R14svc register. The contents of the CPSR from the User32 mode are saved in the SPSRsvc and the contents of the CPSR updated to reflect the SVC32 mode which has been entered. In particular, the five bit field indicating the processing mode is updated. If, whilst in the SVC32 mode, a further exception occurs, such as an aborted memory access, then the Abt32 mode is entered from the SVC32 mode.

In this case, the R13abt and R14abt registers replace the respective R13svc and R14svc registers of the SVC32 mode. The contents of the R15pc register current in the SVC32 mode are saved in the R14abt register. As before, the contents of the CPSR in the SVC32 mode are saved in the SPSRabt.

When the exception handling is complete within the Abt32 mode, the CPU will restore the contents of R14abt to R15pc and the contents of SPSRabt to the CPSR. Restoring the contents of the CPSR to the state they had when the SVC32 mode was last executed will change the 5 bit field indicating the mode back to indicating the SVC32 mode which will automatically change the registers addressed such that the R13svc and R14svc registers are now addressed instead of the R13abt and R14abt registers. Since no processing has occurred upon the R13svc and R14svc registers since the SVC32 mode was exited, then the values within these registers will have been preserved. In combination with the fact that the contents of the R15pc are restored to that which they had when the SVC32 mode was exited, then the SVC32 mode processing will resume at the exact point at which it was exited (providing the contents of R0 to R12 have been restored if these were altered in the Abt32 mode.

In a similar way, when the SVC32 exception handling code has completed its task, the system will return to the User32 mode by substituting the R13 and R14 registers for the R13svc and R14svc registers. At the same time, the contents of the SPSRsvc will be restored to the CPSR.

The overall effect of the above is that an abort exception is nested within a supervisor exception from the user mode User32. The use of the exception mode registers to substitute for corresponding ones of the user mode registers means that the switching between modes can be achieved at high speed. The provision of the saved programming status registers allows a seamless switching and return to be achieved with reduced programming overhead.

Figure 3:
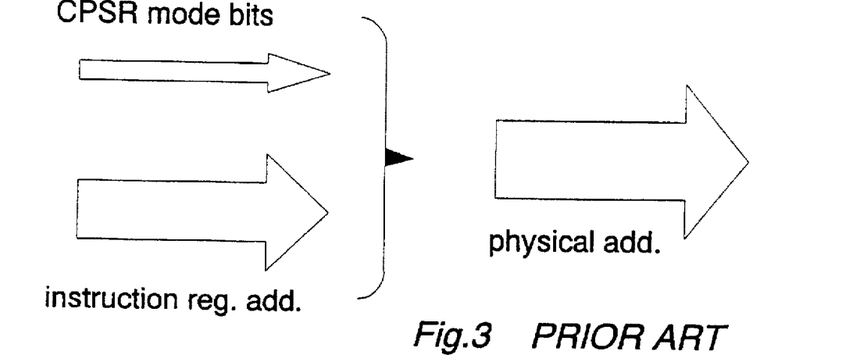
FIG. 3 illustrates how a physical register address is derived from mode bits within the programming status register and the instruction being executed in the system of FIG. 1.

FIG. 3 of the accompanying drawings illustrates how a physical register address identifying a particular one of the user mode registers and the exception mode registers is derived from a combination of the mode bits from the CPSR and an instruction register address as decoded by the register address decoder 17 of FIG. 1.

Figure 4:
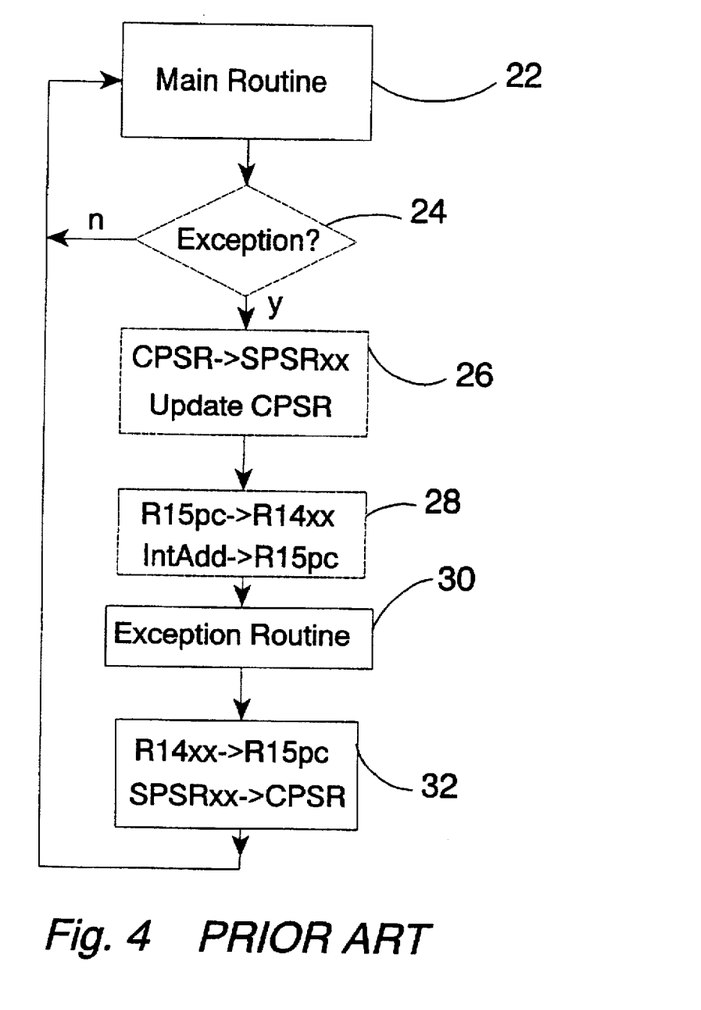
FIG. 4 shows a flow diagram illustrating the switch between a user mode and an exception mode in the system of FIG. 1.

FIG. 4 of the accompanying drawings schematically illustrates the steps that occur when moving between a user mode and an exception processing mode. The data processing apparatus is performing a user mode main routine 22. A step 24 (performed by hardware as denoted by the dashed border of the block) tests as to whether an exception has occurred. If no exception has occurred, then the main routine 22 continues. If an exception has occurred, then control passes to step 26.

In step 26 the contents of the CPSR are stored by hardware to the SPSR of the relevant exception mode that has been identified. The contents of the CPSR are then changed by hardware to reflect the new processing mode that has been entered. At step 28 the contents of the program counter R15pc from the previous mode are saved by hardware in the R14xx of the exception mode that has been entered and the interrupt address IntAdd is written by hardware into the program counter register R15pc.

When the exception mode has been entered after step 28, the system executes an exception routine 30. At the end of the exception routine 30, the contents of the register R14xx are returned under software control to the program counter R15pc and the programming status data of the previous mode is restored from the SPSRxx to the CPSR. This is step 32, after which a return is made to the main routine 22 at the point indicated by the newly restored R15pc.

Figure 5:
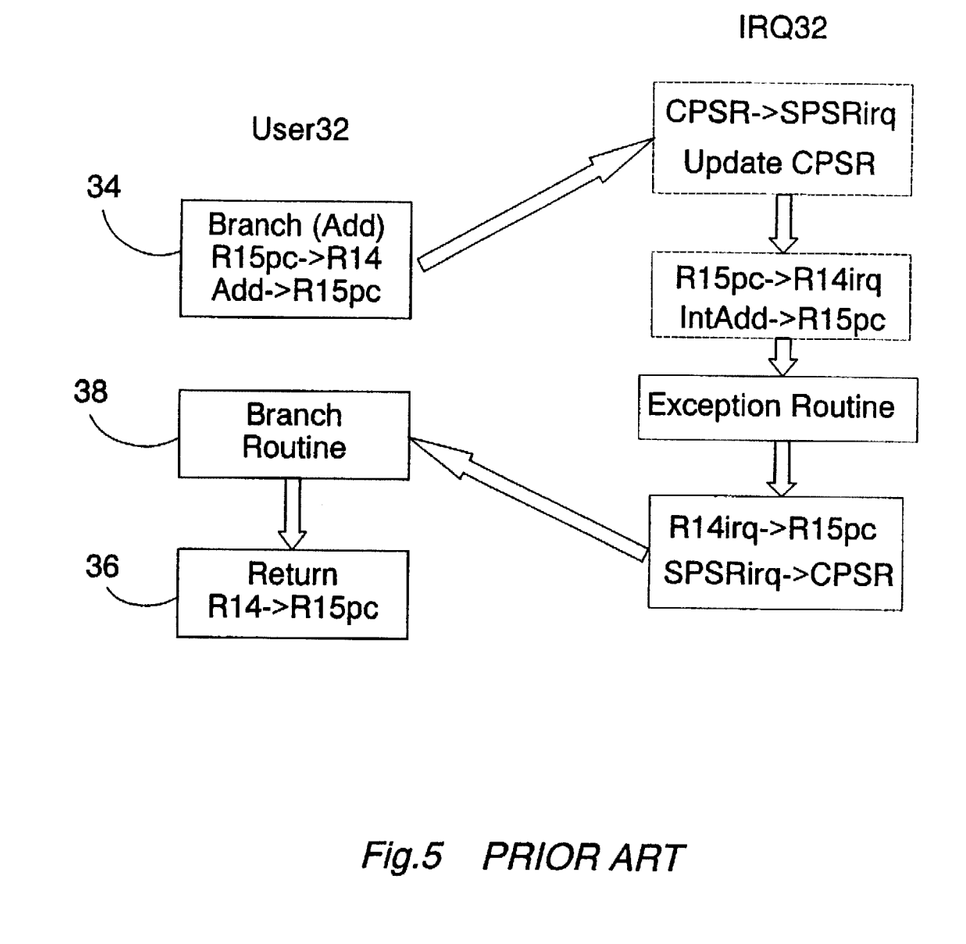
FIG. 5 illustrates the operation of a branch instruction in the system of FIG. 1.

FIG. 5 of the accompanying drawings illustrates the operation of the system described in relation to FIGS. 1 to 4 when encountering a branch instruction. When a branch instruction 34 is executed in the user mode, then the value in the program counter register R15pc is saved to the register R14 and the absolute or relative address Add specified in the branch instruction is placed into the program counter register R15pc from which execution continues. At the end of the branch routine, a return instruction 36 is executed that stores the value held in the register R14 into the program count register R15pc thereby returning execution to the point at which the branch was made. As shown in FIG. 5, if an interrupt (in this case a slow interrupt IRQ) occurs immediately following the branch instruction 34, then the steps saving the current programming status register contents into the save programming status register for the slow interrupt SPSRirq is taken with an update to the CPSR register being made to switch the processing mode. Following this, the contents of the program counter register R15pc are saved to the register R14irq for the slow interrupt mode. The interrupt address vector IntAdd is then placed into the program counter register R15pc following which the exception routine is commenced. At the end of the exception routine, the program counter value before the exception occurred that is stored in register R14irq is restored to the program counter register R15pc and the saved program status values are restored to the current program status register CPSR. Control then returns to the branch routine at step 38.

In the case illustrated in FIG. 5, since the register R14irq is substituted for the user mode register R14 when the interrupt occurs, the return address for the branch stored in register R14 at step 34 is not overwritten and accordingly the return at step 36 is correct.

Figure 6:
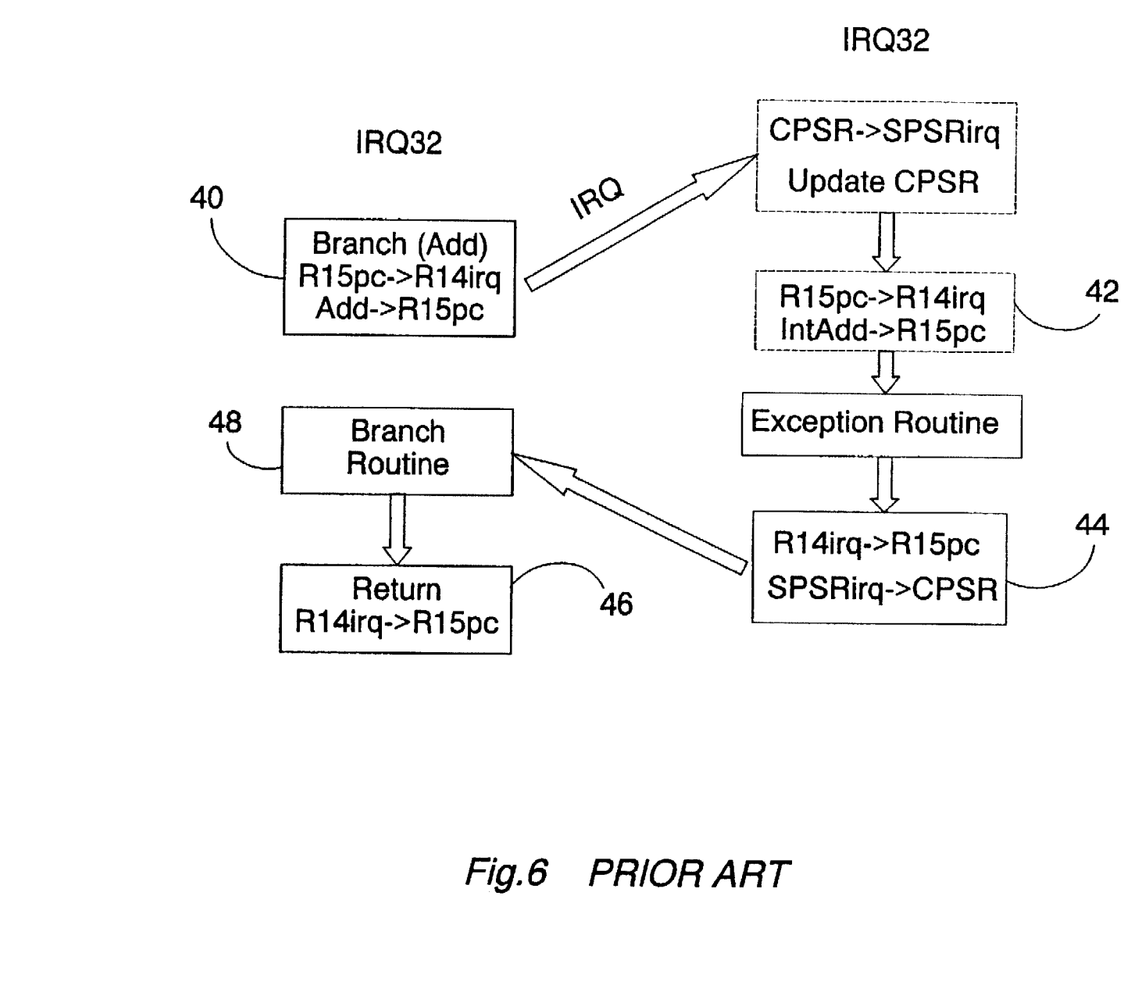
FIG. 6 illustrates the problem that can occur when a branch instruction is used within an exception mode in the system of FIG. 1.

FIG. 6 of the accompanying drawings illustrates the same situation as that in FIG. 5 with the exception that the system starts in the slow interrupt mode IRQ32 and a branch instruction 40 occurs during the exception handling routine in this mode. Following this branch instruction 40, a further exception of the same type (i.e. a slow interrupt IRQ) occurs. In this case, at step 42 the contents of the program counter register R15pc are written into the register R14irq overwriting the return address for the branch instruction 40 with the return address for the second exception. Accordingly, whilst the instruction 44 returning from the second exception will execute correctly, the instruction 46 at the end of the branch will be expecting the contents of the register R14irq to represent the return address for the branch whereas these will in fact be the return address for the second exception, i.e. the address of instruction 48. Thus, the system then malfunction and be locked in a loop passing through instructions 48 and 46.

As will be seen from FIG. 6, the use of branch instructions within exception handling modes must be avoided.

Figure 7:
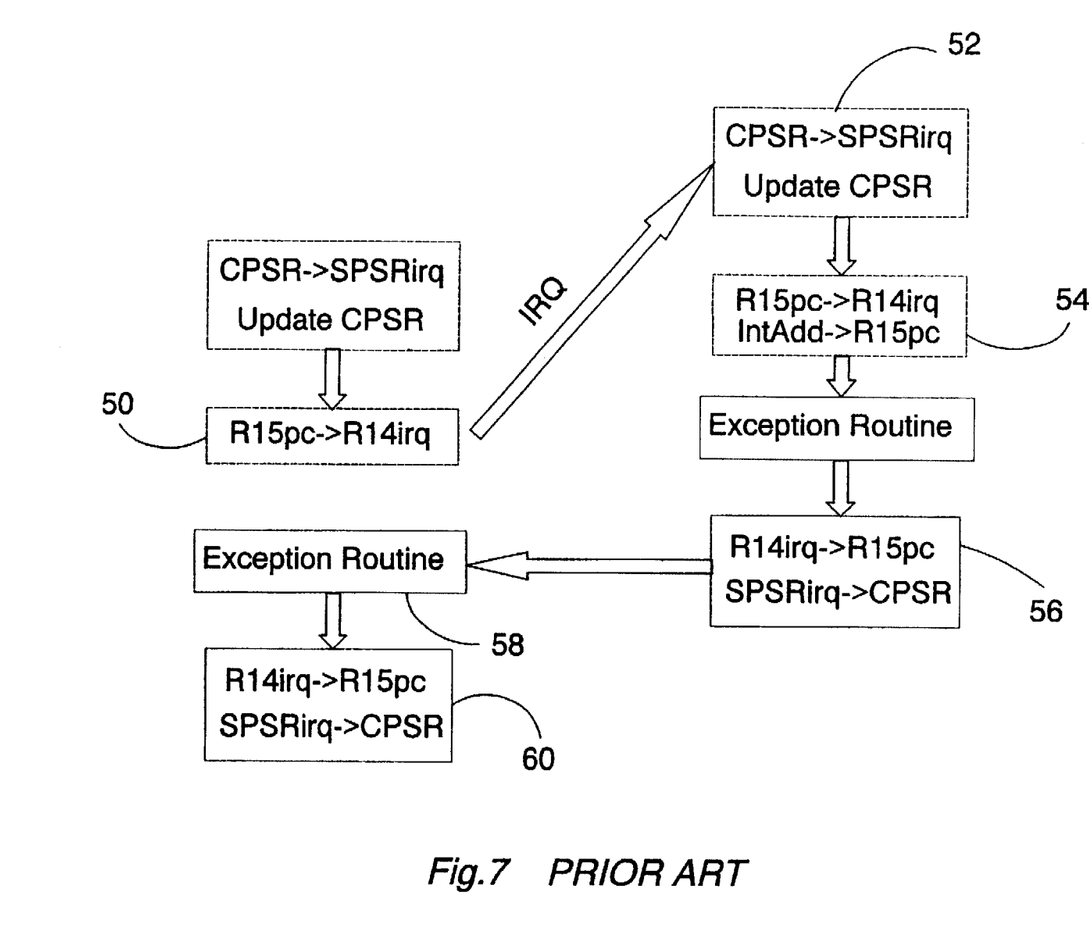
FIG. 7 illustrates the problem that can occur when a further exception of the same type occurs with an exception mode when using the system of FIG. 1.

FIG. 7 of the accompanying drawings illustrates a similar problem that can arise when the system is already operating in an exception mode, e.g. the slow interrupt IRQ32 mode, and a further exception of the same type occurs. At step 50, the return address within the user mode at which point the exception occurred is stored in register R14irq. If immediately following this first interrupt and before the value saved in R14irq can be saved elsewhere, a second interrupt of the same type occurs, then control passes to step 52. Following this, at step 54, the value written in register R14irq at step 50 is overwritten with the current program counter value R15pc. At the end of the second exception routine at step 56, return is passed to the first exception routine at step 58 and the correct return address stored in register R14irq is reloaded into the program counter register R15pc. However, at the end of the first exception routine at step 60, the return address that was written initially into the register R14irq to take the system back to the appropriate point in the user mode has been lost and instead the register R14irq points to step 58 and the system will become locked in a loop.

It will be appreciated from the above that in view of the problems illustrated with reference to FIGS. 6 and 7, interrupts of the same type and the use of branch instructions must be prohibited within exception modes. This is a significant disadvantage. It is these problems that are address by the present invention.

SUMMARY OF THE INVENTION

Viewed from one aspect the invention provides apparatus for processing data, said apparatus being switchable between operation in a user mode, an exception mode and a system mode, said apparatus comprising:

(i) a program counter register for storing data indicative of an address of a currently executing program instruction;

(ii) a set of user mode registers for storing data to be manipulated during said user mode, operation in said user mode allowing access to a set of standard resources within said apparatus;

(iii) at least one exception mode register for storing data to be manipulated during said exception mode, operation in said exception mode allowing access to a set of privileged resources within said apparatus;

(iv) an exception controller for switching operation from said user mode to said exception mode upon occurrence of an exception, said exception controller being non-responsive to a further occurrence of said exception whilst said apparatus is operating in said exception mode;

(v) means for storing as a return address said data indicative of an address of a currently executing program instruction into one of said at least one exception mode register serving as a return address register upon entering said exception handling mode;

(vi) means for redirecting read requests and write requests from a respective corresponding one of said set of user mode registers to said at least one exception mode register when operating in said exception mode;

(vii) means for switching operation from said exception mode to said system mode upon execution of a first mode switching program instruction within said exception mode, operation in said system mode being responsive to further exceptions and utilising said set of user mode registers and allowing access to said set of privileged resources within said apparatus;

(viii) means for switching operation from said system mode to said exception mode upon execution of a second mode switching program instruction within said system mode;

(ix) means for restoring said return address stored in said return address register to said program counter register upon leaving said exception processing mode; and (x) means for switching operation from said exception mode to said user mode upon execution of a third mode switching program instructions within said exception mode.

The invention maintains the use of exception mode registers to which read and write requests are re-directed so as to maintain the ability to perform high speed interrupt handling when this is appropriate. In combination with this, the invention provides a system mode of operation in which all of the interrupts are enabled so as to provide responsiveness to a further exception of the same type and yet with the mechanism of switching to the system mode via the exception mode such that the return address and any other data within the registers may be safely saved prior to re-enabling the interrupts. The invention also has the advantage of providing this additional functionality without requiring the addition of a disadvantageously large amount of additional circuitry. This is achieved by re-using the user mode registers for data processing in the system mode so avoiding the need to provide dedicated registers for system mode processing. This is possible since the system mode is reached via the exception mode in which any existing data within the user mode registers may be saved before the system mode is entered.

In preferred embodiments of the invention said plurality of user mode registers include a user mode stack pointer register for holding data indicative of a current address within a stack memory area used by said user mode, said at least one exception mode register includes an exception mode stack pointer register for holding data indicative of a current address within a stack memory area used by said exception mode and said means for redirecting redirects read requests and write requests from said user mode stack pointer register to said exception mode stack pointer register when operating in said exception mode.

The provision of a stack with an associated stack pointer is usual and advantageous within processor architectures. The ability to have a stack immediately available within an exception mode is highly useful and so it has been found advantageous to provide an exception mode stack pointer register.

It will be appreciated that the exception mode can take a number of forms. Furthermore, it is possible that more than one exception mode may be provided. Advantageous exception mode types provided by preferred embodiments of the invention include a fast interrupt request mode entered when an externally applied fast interrupt signal is detected and said fast interrupt mode is enabled;

a supervisor mode entered when said data processing apparatus is reset or upon execution of a software interrupt instruction;

an abort mode entered when a memory access is aborted;

a slow interrupt request mode entered when an externally applied slow interrupt signal is detected and said slow interrupt mode is enabled; and an undefined mode entered when an undefined software instruction is encountered.

A further preferred feature of the invention is such that when said plurality of exception modes include one or more high speed exception modes and one or more low speed exception modes, said one or more high speed exception modes having a greater number of associated exception mode registers to be made directly available for use upon entering said one or more high speed exception modes than said one or more low speed exception modes.

In order to provide high speed exception handling, particularly in the case of high speed exception modes, a further preferred feature is the provision of a write buffer into which data from said user mode registers may be written prior to storage elsewhere, said write buffer having a data storage capacity equal to or greater than an amount of data contained within those user mode registers not substituted with exception mode registers in said one or more high speed exception modes.

Having such a write buffer enables the data in user mode registers that are still in use to be written to the write buffer and so protected without having to wait for relatively slow external DMA accesses to take place.

This advantage is further enhanced in embodiments comprising means for reading from a plurality of user mode registers and exception mode registers in response to single store multiple software instruction and means for writing to a plurality of user mode registers and exception mode registers in response to single load multiple software instruction.

The ability to save such otherwise unprotected data with a single instruction speeds up the exception handling.

A further feature which speeds up the operation of the high speed exception modes is that these commence exception handling code execution directly from an exception vector.

A particularly convenient way of handling the re-directing of read and write requests between the user mode registers and the exception mode registers is one in which said user mode registers and said exception mode registers are addressed using a register address formed from an instruction portion derived from an executed software instruction and a mode portion derived from at least some bits of said data indicative of processing status stored in a processing status register.

Furthermore, with such an arrangement said program status register stores data controlling in which of said user mode, said exception mode and said system mode said apparatus operates, said first mode switching program instruction, said second mode switching program instruction and said third mode switching program instruction acting to write changed data into said program status register to effect mode switching.

It will be appreciated that there is a significant difference between the standard set of resources and the privileged set of resources. In normal operation executing a user software, it is not appropriate for that software to have access to features and functions of the data processing apparatus that are more properly the responsibility of lower levels within the system, such as the operating system or the hardware interrupt handlers. If access were available to such resources in the user mode, then an error or bug in a software program executing in the user mode could have dramatic consequences to the system and data integrity through its ability to access sensitive resources within the system. The converse of this is that in dealing with various exceptions, access to sensitive areas of the system may well be required and so it is important that when in the exception mode the exception handling code has the fullest possible set of available resources.

A particularly significant and advantageous distinction between the standard and privileged resources is that said standard set of resources includes access to standard data storage areas within a data memory and said privileged set of resources includes access to said standard data storage areas and privileged data storage areas within said data memory.

When a sophisticated exception handling routine is to be performed and so it is desired to switch to the system mode, then as short a time as practical need be spent in the exception mode. In order to protect the system integrity before re-enabling the exception interrupts it is advantageous that the system includes means responsive to program instructions for storing data stored in said return address register into a temporary storage area prior to executing said first mode switching program instruction and means responsive to program instructions for returning data stored in said temporary storage area to said return address register prior to executing said third mode switching program instruction.

A convenient and directly available temporary storage area that may be provided is the stack memory area used by the exception mode.

Viewed from another aspect the invention provides a method of processing data with apparatus for data processing, said apparatus being switchable between operation in a user mode, an exception mode and a system mode, said method comprising the steps of:

(i) storing in a program counter register data indicative of an address of a currently executing program instruction;

(ii) storing in a set of user mode registers data to be manipulated during said user mode, operation in said user mode allowing access to a set of standard resources within said apparatus;

(iii) storing within at least one exception mode register data to be manipulated during said exception mode, operation in said exception mode allowing access to a set of privileged resources within said apparatus;

(iv) switching operation using an exception controller from said user mode to said exception mode upon occurrence of an exception, said exception controller being non-responsive to a further occurrence of said exception whilst said apparatus is operating in said exception mode;

(v) storing as a return address said data indicative of an address of a currently executing program instruction into one of said at least one exception mode register serving as a return address register upon entering said exception handling mode;

(vi) redirecting read requests and write requests from a respective corresponding one of said set of user mode registers to said at least one exception mode register when operating in said exception mode;

(vii) switching operation from said exception mode to said system mode upon execution of a first mode switching program instruction within said exception mode, operation in said system mode being responsive to further exceptions and utilising said set of user mode registers and allowing access to said set of privileged resources within said apparatus;

(viii) switching operation from said system mode to said exception mode upon execution of a second mode switching program instruction within said system mode;

(ix) restoring said return address stored in said return address register to said program counter register upon leaving said exception processing mode; and (x) switching operation from said exception mode to said user mode upon execution of a third mode switching program instructions within said exception mode.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 8:
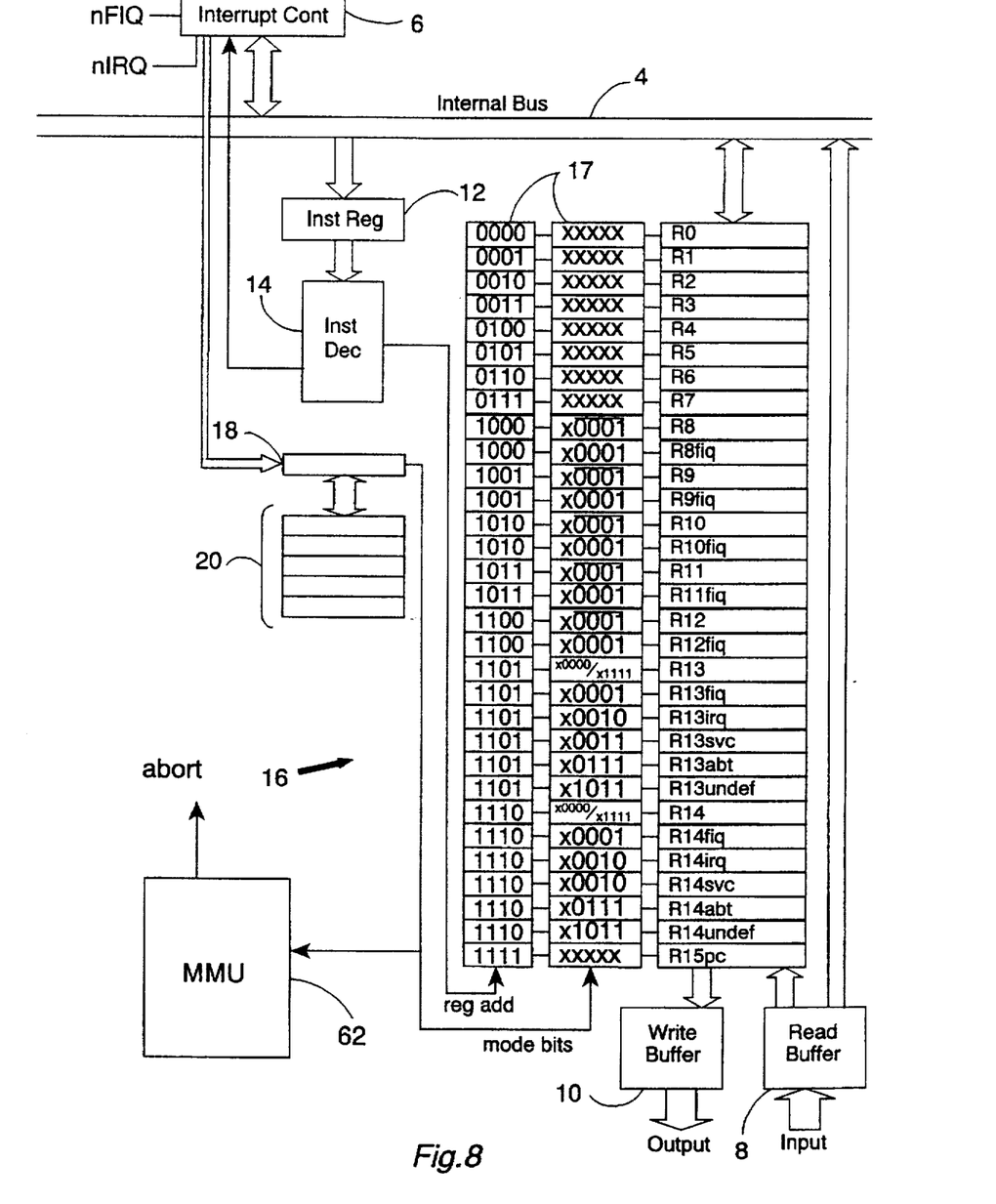
FIG. 8 schematically illustrates a CPU architecture that has been modified from that shown in FIG. 1 to provide an additional exception mode.

FIG. 8 illustrates a CPU architecture modified from that illustrated in FIG. 1. The corresponding elements between the CPU architectures of FIG. 1 and FIG. 8 have been given the same reference numerals and the description thereof will not be repeated.

The CPU architecture of FIG. 8 provides an additional exception mode with access to a set of privileged resource rather than to the standard set of resources available in the user mode. This additional exception mode (the system mode) is identified by the mode bits x1111. The register address decoder 17 is modified such that an address match is found for registers R13 and R14 when the register address is either 1101 or 1110 respectively and the mode bits correspond to either the user mode or the system mode. Thus, as will be seen from the instruction decoder 17, the user mode and the system mode share the set of user registers R0 to R14.

Whilst the user mode and the system mode share the same set of registers, the differing mode bits specified in each of these modes controls the set of resources that are available when in these modes. For example, the mode bits are supplied to a memory management unit (MMU) 62. In response to these mode bits, the MMU 62 determines what memory mappings are used and issues an abort signal to override a memory access request to an inappropriate address issued when in a mode not having privileged access to that address. Further examples of privileged resources available in the system mode, but not in the user mode, would be the ability to manipulate parameters concerning the system clocks and input/output systems. Such privileged resources need to be available when dealing with exceptions but could allow serious malfunctions with data loss if inappropriately altered within the user mode.

The modification of the register address decoder 17 to cater for the system mode requires little extra hardware to be added to the CPU. Furthermore, since the system mode re-uses the user mode registers, no additional registers need be provided thus avoiding an undesirable increase in circuit area.

Figure 9:
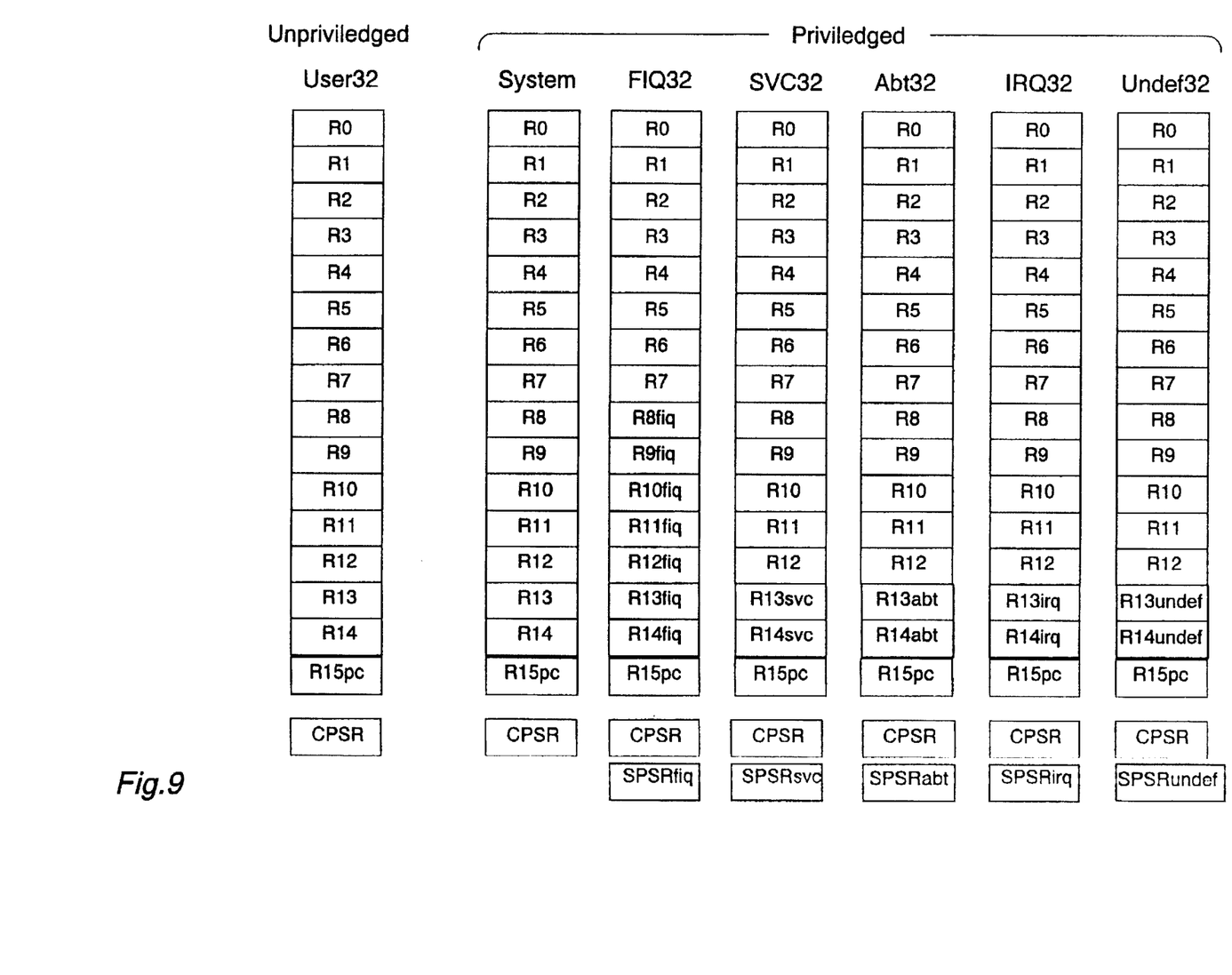
FIG. 9 illustrates the data registers available in a user mode and a number of exception modes including a system mode.

FIG. 9 illustrates the data registers available in the user mode and the exception modes with the system of FIG. 8. The difference between the available registers for the system of FIG. 8 compared to that of the system of FIG. 1 illustrated in FIG. 2 is the addition of the system mode which shares the user mode registers R0 to R14 whilst maintaining privileged resource access. The system mode has no need of a saved program status register since it is entered under control of software instructions from an exception mode rather than by a hardware process on occurrence of an asynchronous interrupt or other exception triggering event.

Figure 10:
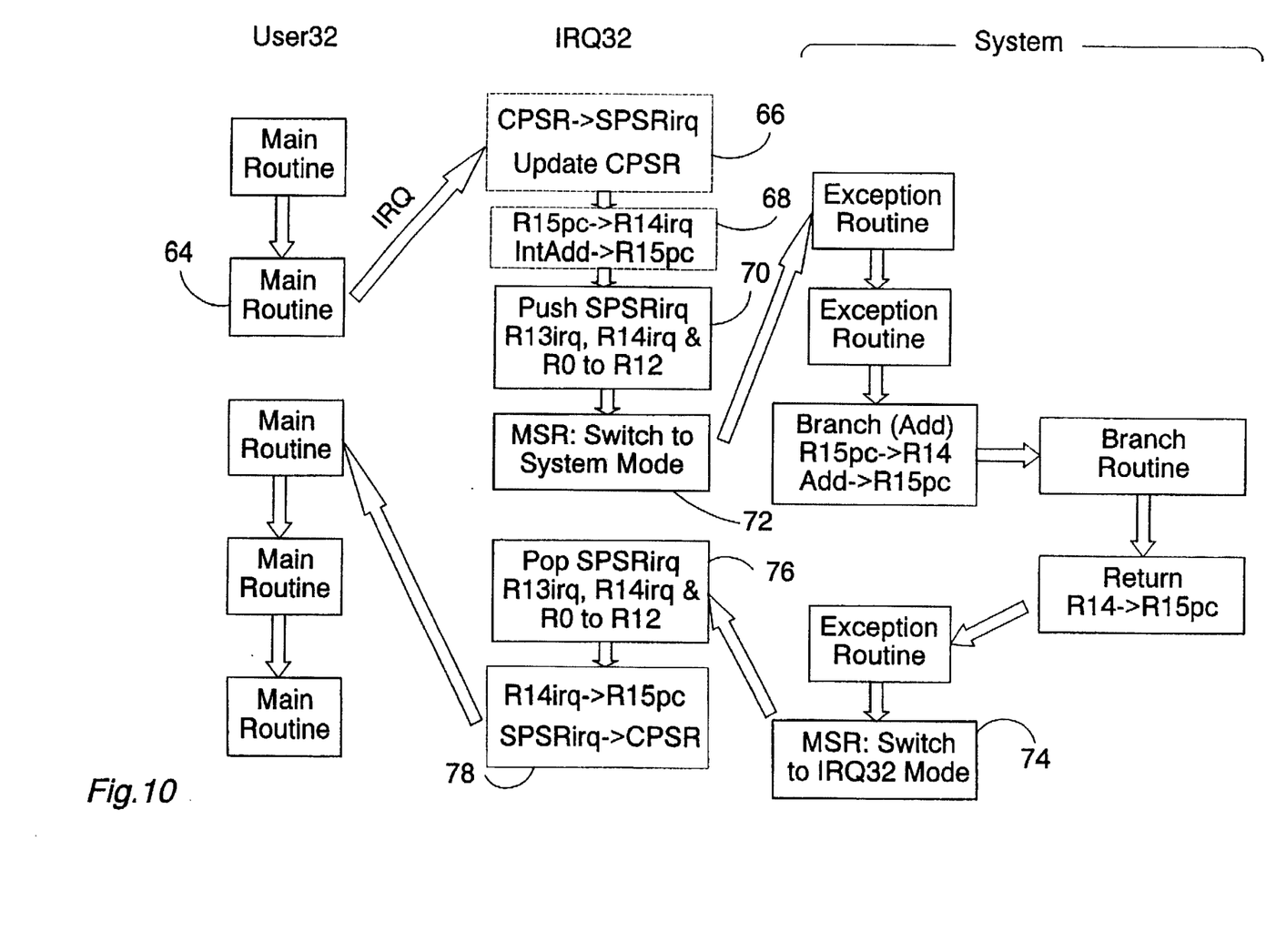
FIG. 10 illustrates the handling of an exception that occurs within the user mode with an exception handling routine that may include branch instructions when utilising the system of FIG. 8.

FIG. 10 illustrates how the system of FIG. 8 deals with an exception, in this case a slow interrupt IRQ. The system progresses through the instructions of the main routine in the user mode to an instruction 64. At this stage, a slow interrupt signal IRQ is asserted to the interrupt controller 6 and causes the steps 66 and 68 to occur under hardware control (the hardware rather than software nature of these steps is represented by the dashed borders of the steps). In these steps, the current program status register CPSR of the user mode is saved and then the current program status register updated, the program counter register contents are saved and the interrupt vector address IntAdd is loaded into the program counter register R15pc. This process is the same as that illustrated for the system of FIG. 1. In the slow interrupt mode IRQ32, responsiveness to any further slow interrupts is disabled. Those interrupts that are disabled within each mode of operation are given below in Table 1. It will be noted that in the fast interrupt mode, FIQ32, both further fast interrupts and slow interrupts are disabled in order that a fast interrupt should not be delayed in being handled by a slow interrupt.

TABLE 1

| MODE System | Disabled Interrupts | |
|---|---|---|
| FIQ32 | FIQ32 | IRQ32 |
| IRQ32 | IRQ32 | |
| Abt32 | IRQ32 | |
| SVC32 | IRQ32 | |
| Undef32 | IRQ32 | |

At step 70, the first task within the exception mode is to save the contents of all its registers and the saved program status register. This is done by pushing these contents onto the stack memory area pointed to by the stack pointer held in register R13irq. If the exception handling routine was particularly simple, then there would be the freedom not to do this, so saving time, and instead stay entirely within that exception mode as in the system of FIG. 1. However, in the present case, once step 70 has been completed, the system executes a first program instruction at step 72 that modifies the contents of the current programming status register CPSR to be x1111 which moves the system into the system mode. A full and relatively sophisticated exception handling routine can now be executed within the system mode. This exception handling routine may include branch instructions. At the end of the exception handling routine in step 74, a second program instruction is executed that modifies the current program status register CPSR contents to move the system back to the originating exception mode IRQ32 which is re-entered at step 76. Step 76 serves to reload the registers from the contents of the stack saved at step 70. At step 78, a third program instruction is executed that moves the system back to the user mode.

The overall operation illustrated in FIG. 2 may be considered as providing a small stub routine within the exception mode IRQ32 which serves to save the register contents prior to moving to the system mode in which all of the interrupts are enabled and within which branch instructions may be freely used without risk of losing return addresses.

Figure 11A:
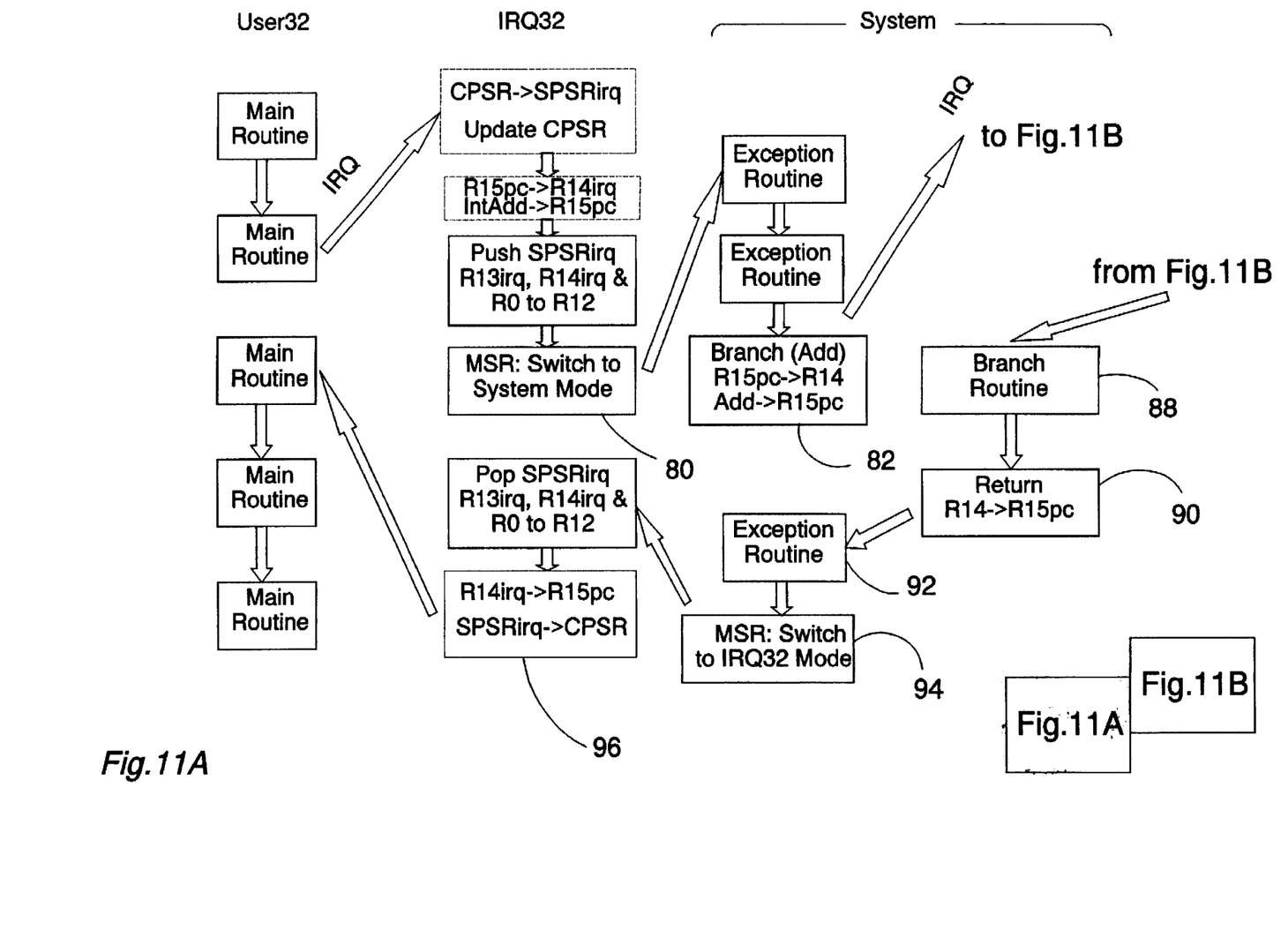
FIGS. 11A and 11B comprise a block diagram that illustrates the situation in which nested exceptions of the same exception type and each including branch instructions within their exception handling routines are dealt with by the system of FIG. 8.
Figure 11B:
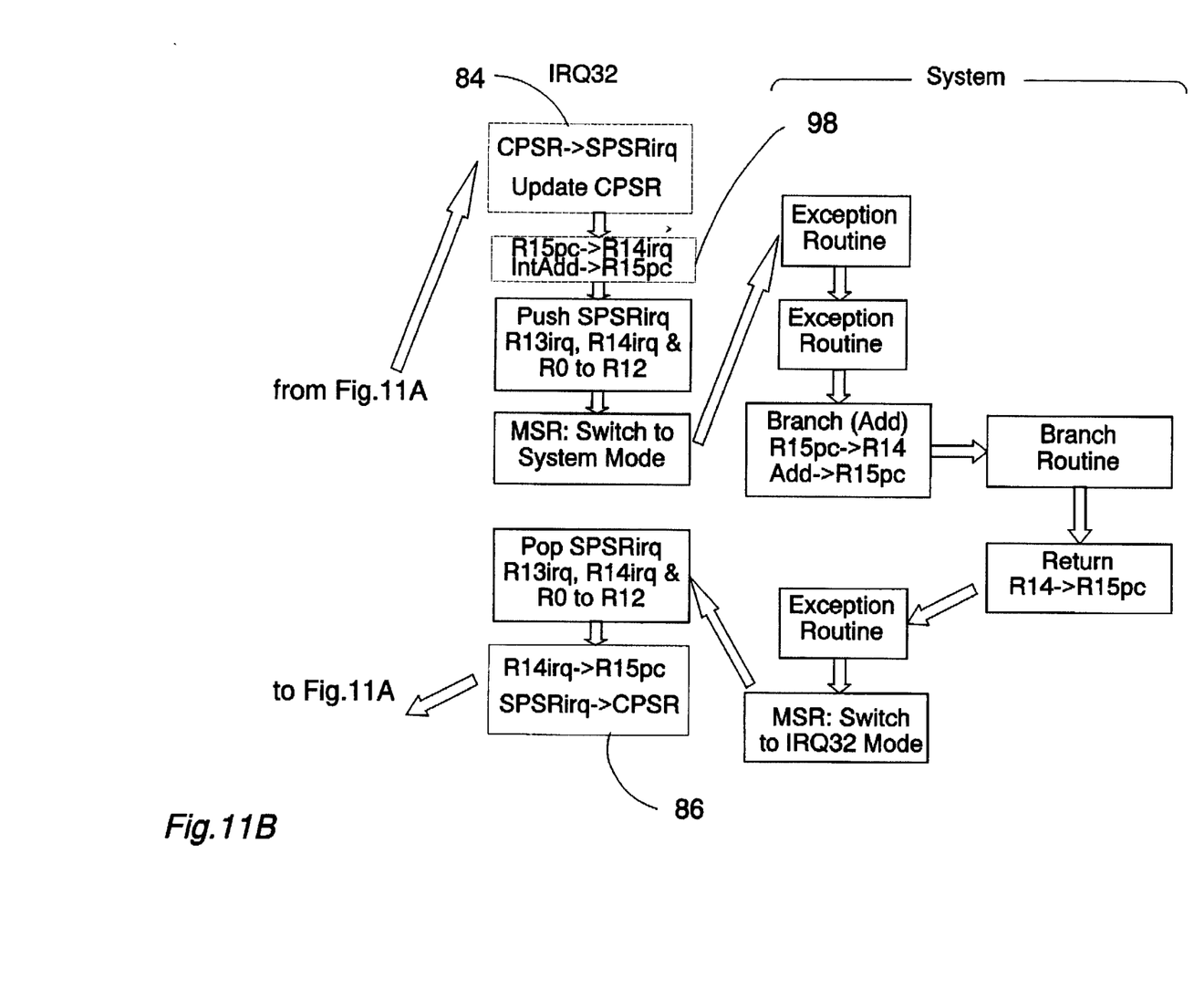

FIG. 11 illustrates another scenario. In this case, a first exception event occurs moving the system into IRQ32 mode. The event is then dealt with by an exception handling routine operating in the system mode to which the CPU is moved by a step 80. This exception handling routine includes a branch instruction 82. Just after this branch instruction has executed, a further interrupt of the same type already being dealt with occurs and the system is moved under hardware control back to the LRQ32 mode. Thus, a nested interrupt of the same type has occurred immediately after a branch instruction. In this situation, the system of FIG. 1 would malfunction.

The second exception event is then dealt with by steps 84 to 86 after which time control is returned to the branch routine 88. Since the branch return address at step 82 was written into register R14 rather than R14irq, the branch return instruction at step 90 operates correctly and returns the system to the exception routine within the system mode at step 92.

At step 94, control is returned to the IRQ32 mode of the first exception whereupon the registers content saved upon the stack are restored prior to returning to the user mode at step 96. Since the return address to the user mode was saved on the stack to be later restored to register R14irq, the occurrence of the second exception and the hardware controlled step 98 that overwrites R14irq does not destroy the return address to the user mode.

In summary, the modification of the system of FIG. 8 over that of FIG. 1 allows nested interrupts of the same type and the use of branch instructions within exception handling routines. This enables easier programming of exception handling and make the occurrence of nested exceptions of the same type less critical whilst maintaining the advantages of allowing rapid interrupt handling without recourse to the system mode if this is appropriate.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus being switchable between operation in a user mode, an exception mode and a system mode, said apparatus comprising:

(i) a program counter register for storing data indicative of an address of a currently executing program instruction;

(ii) a set of user mode registers for storing data to be manipulated during said user mode, operation in said user mode allowing access to a set of standard resources within said apparatus;

(iii) at least one exception mode register for storing data to be manipulated during said exception mode, operation in said exception mode allowing access to a set of privileged resources within said apparatus;

(iv) an exception controller for switching operation from said user mode to said exception mode upon occurrence of an exception, said exception controller being non-responsive to a further occurrence of said exception whilst said apparatus is operating in said exception mode;

(v) means for storing as a return address said data indicative of an address of a currently executing program instruction into one of said at least one exception mode register serving as a return address register upon entering said exception mode;

(vi) means for redirecting read requests and write requests from a respective corresponding one of said set of user mode registers to said at least one exception mode register when operating in said exception mode;

(vii) means for switching operation from said exception mode to said system mode upon execution of a first mode switching program instruction within said exception mode, operation in said system mode being responsive to further exceptions and utilising said set of user mode registers and allowing access to said set of privileged resources within said apparatus;

(viii) means for switching operation from said system mode to said exception mode upon execution of a second mode switching program instruction within said system mode;

(ix) means for restoring said return address stored in said return address register to said program counter register upon leaving said exception mode; and (x) means for switching operation from said exception mode to said user mode upon execution of a third mode switching program instruction within said exception mode.

2. Apparatus as claimed in claim 1, wherein said plurality of user mode registers include a user mode stack pointer register for holding data indicative of a current address within a stack memory area used by said user mode, said at least one exception mode register includes an exception mode stack pointer register for holding data indicative of a current address within a stack memory area used by said exception mode and said means for redirecting redirects read requests and write requests from said user mode stack pointer register to said exception mode stack pointer register when operating in said exception mode.

3. Apparatus as claimed in claim 1, wherein said exception mode is selected from the group comprising:
- a fast interrupt request mode entered when an externally applied fast interrupt signal is detected and said fast interrupt mode is enabled;
- a supervisor mode entered when said data processing apparatus is reset or upon execution of a software interrupt instruction;
- an abort mode entered when a memory access is aborted;
- a slow interrupt request mode entered when an externally applied slow interrupt signal is detected and said slow interrupt mode is enabled; and
- an undefined mode entered when an undefined software instruction is encountered.

4. Apparatus as claimed in claim 1, having a plurality of exception modes each having at least one exception register.

5. Apparatus as claimed in claim 4, wherein when a differing exception occurs within an exception mode:
said means for redirecting redirects read requests and write requests from a respective user mode register or exception mode register currently in use to said at least one exception mode register corresponding to said differing exception.

6. Apparatus as claimed in claim 4, wherein said plurality of exception processing modes are selected from the group comprising:
- a fast interrupt request mode entered when an externally applied fast interrupt signal is detected and said fast interrupt mode is enabled;
- a supervisor mode entered when said data processing apparatus is reset or upon execution of a software interrupt instruction;
- an abort mode entered when a memory access is aborted;
- a slow interrupt request mode entered when an externally applied slow interrupt signal is detected and said slow interrupt mode is enabled; and
- an undefined mode entered when an undefined software instruction is encountered.

7. Apparatus as claimed in claim 4, wherein said plurality of exception modes include one or more high speed exception modes and one or more low speed exception modes, said one or more high speed exception modes having a greater number of associated exception mode registers to be made directly available for use upon entering said one or more high speed exception modes than said one or more low speed exception modes.

8. Apparatus as claimed in claim 7, comprising a write buffer into which data from said user mode registers may be written prior to storage elsewhere, said write buffer having a data storage capacity equal to or greater than an amount of data contained within user mode registers not substituted with exception mode registers in said one or more high speed exception modes.

9. Apparatus as claimed in claim 7, wherein said one or more high speed exception processing modes commence exception handling code execution directly from an exception vector.

10. Apparatus as claimed in claim 1, comprising means for reading from a plurality of user mode registers and exception mode registers in response to single store multiple software instruction and means for writing to a plurality of user mode registers and exception mode registers in response to single load multiple software instruction.

11. Apparatus as claimed in claim 1, wherein said user mode registers and said exception mode registers are addressed using a register address formed from an instruction portion derived from an executed software instruction and a mode portion derived from at least some bits of processing status data indicative of processing status stored in a processing status register.

12. Apparatus as claimed in claim 11, wherein said processing status register stores data controlling in which of said user mode, said exception mode and said system mode said apparatus operates, said first mode switching program instruction, said second mode switching program instruction and said third mode switching program instruction acting to write changed data into said processing status register to effect mode switching.

13. Apparatus as claimed in claim 1, wherein said standard set of resources includes access to standard data storage areas within a data memory and said privileged set of resources includes access to said standard data storage areas and privileged data storage areas within said data memory.

14. Apparatus as claimed in claim 1, comprising means responsive to program instructions for storing data stored in said return address register into a temporary storage area prior to executing said first mode switching program instruction and means responsive to program instructions for returning data stored in said temporary storage area to said return address register prior to executing said third mode switching program instruction.

15. Apparatus as claimed in claim 14, wherein said plurality of user mode registers include a user mode stack pointer register for holding data indicative of a current address within a stack memory area used by said user mode, said at least one exception mode register includes an exception mode stack pointer register for holding data indicative of a current address within a stack memory area used by said exception mode, said means for redirecting redirects read requests and write requests from said user mode stack pointer register to said exception mode stack pointer register when operating in said exception mode and said temporary storage area comprises said stack memory area used by said exception mode.

16. A method of processing data with apparatus for data processing, said apparatus being switchable between operation in a user mode, an exception mode and a system mode, said method comprising the steps of:
(i) storing in a program counter register data indicative of an address of a currently executing program instruction;
(ii) storing in a set of user mode registers data to be manipulated during said user mode, operation in said user mode allowing access to a set of standard resources within said apparatus;
(iii) storing within at least one exception mode register data to be manipulated during said exception mode, operation in said exception mode allowing access to a set of privileged resources within said apparatus;
(iv) switching operation using an exception controller from said user mode to said exception mode upon occurrence of an exception, said exception controller being non-responsive to a further occurrence of said exception whilst said apparatus is operating in said exception mode;

(v) storing as a return address said data indicative of an address of a currently executing program instruction into one of said at least one exception mode register serving as a return address register upon entering said exception mode;

(vi) redirecting read requests and write requests from a respective corresponding one of said set of user mode registers to said at least one exception mode register when operating in said exception mode;

(vii) switching operation from said exception mode to said system mode upon execution of a first mode switching program instruction within said exception mode, operation in said system mode being responsive to further exceptions and utilising said set of user mode registers and allowing access to said set of privileged resources within said apparatus;

(viii) switching operation from said system mode to said exception mode upon execution of a second mode switching program instruction within said system mode;

(ix) restoring said return address stored in said return address register to said program counter register upon leaving said exception mode; and (x) switching operation from said exception mode to said user mode upon execution of a third mode switching program instruction within said exception mode.

* * * * *